Patented Sept. 20, 1932

1,878,127

UNITED STATES PATENT OFFICE

CHESTER EARL GRAY, OF OAKLAND, CALIFORNIA, ASSIGNOR OF ONE-HALF TO GROVER D. TURNBOW, OF OAKLAND, CALIFORNIA

FROZEN FOOD PRODUCT AND METHOD OF MAKING SAME

No Drawing.   Application filed June 22, 1926. Serial No. 117,855.

This invention relates to frozen food products containing milk solids, not fat, especially, though not necessarily exclusively, ice cream, and to an improved method or process for the preparation of such products.

In the preparation of frozen food products, more especially ice cream, it has been the desire of manufacturers to produce a product having relatively high percentages of milk solids not fat, on account of the exceedingly beneficial results coming from the milk proteins (casein and albumen). The inclusion in the product of this relatively high percentage of milk solids not fat is of primary importance while the quantity of milk salts and lactose (milk sugar) is more or less of secondary importance, although, from a nutritional standpoint all of the constituents of milk solids not fat, are most beneficial and it is, therefore, preferred that there be no unnecessary elimination of the salts and lactose in an effort to increase the quantity of proteins found in the final product. However, aside from the nutritional value, the increased percentage of milk proteins adds especially to the other desirable qualities of the frozen products.

Heretofore, it has not been possible to secure the desired percentage of milk proteins in the final product without detrimental effect on such product because of the fact that when such proteins, together with the other constituents of normal milk solids not fat, are added to the mixture the lactose inherently present will be brought to a percentage whereby its relation to the water contained in the mixture will produce supersaturation at the temperature of the frozen product with the result that crystalization of the lactose or milk sugar will take place, thereby giving a very rough and sandy consistency to the product which is an exceedingly objectionable characteristic. This condition, in the trade, is usually referred to as " sandy ice cream," and is a matter of such importance that the literature of the ice cream-making industry contains numerous papers on the subject, many of these papers being reports of extensive research work on the subject. As the result of such research work some investigators have concluded that the only procedure to be followed, if ice cream of smooth consistency, as to its lactose or milk sugar content, is to be obtained, is to keep the volume or quantity of milk solids not fat, at a point low enough with relation to the volume or quantity of the entire mixture so that the lactose contained in the mixture will be below the saturation point in the final frozen mixture. This elimination of the amount of milk solids not fat to be used, as just indicated, results in the percentage of milk proteins in the final product being also necessarily limited and to obtain the desirable smooth consistency in the final product ice cream manufacturers have resorted to the use of gelatine. However, this use of gelatine has, in turn, resulted in the increased cost of the production of the cream on account of the price of gelatine. Furthermore, where gelatine has been used unfavorable results have been obtained in many cases due to the fact that the gelatine sometimes carries undesirable bacteria and is almost constantly variable in quality.

With the foregoing in mind, the present invention seeks to make possible, in a simple but efficient manner, the increasing of the milk solids not fat, used in the production of ice cream or like product to a point appreciably beyond that which has heretofore been possible, thereby resulting in a new and improved product that is very superior not only from a standpoint of texture, palatability, and stability, but also showing marked improvement in dispensing qualities as well as also being superior from the standpoint of nutritional properties possessed thereby.

More specifically, the present invention has for an object the increase in percentages of proteins contained in the final frozen product while at the same time preventing the formation of particles of crystallized milk sugar such as would cause the final product to be of sandy consistency as to its lactose or milk sugar content. In other words, it is desirable that the final product while possessing high percentages of proteins would be of the desired smooth consistency notwthstanding the high percentage of lactose or milk sugar present therein and while this result would be secured in one of several ways it is preferred that the method employed be such as to prevent the formation of crystals of milk sugar of such appreciable size as to render the final product "sandy". That is, the finished product will not contain any particles of lactose, in a crystallized or undissolved state, of such a size as to be noticeable on the tongue of any one eating the product. In other words, any crystallized or undissolved milk sugar that might be present, will be in particles that might be described as impalpable. In this connection, the presence of particles of milk sugar is not to be confused with the formation of water crystals not infrequently observed in ice cream. The formation of crystallized lactose presents a problem totally different from the formation of water crystals. Hence, the previous designation of the present invention as dealing with a product of smooth consistency as to its milk sugar or lactose content. Such a method as this is preferred not only from an economical standpoint but also from a nutritional standpoint because, while it is possible to prevent the formation of the undersirable crystals of milk sugar by the elimination of the sugar itself, such an elimination of the sugar has its disadvantages in that the method of elimination is more or less impracticable from a commercial standpoint and the resulting product does not possess the same nutritional value by reason of the absence of the lactose or milk sugar. It has also been proposed to remove the casein and incorporate it in the frozen product in an effort to maintain the desired nutritional value while eliminating the sandy characteristic of the product, but this practice is also believed to be undesirable in that it results in substantially a complete and permanent elimination of the albumen, lactose, and milk salts in the final product all three of which are desirable.

By reason of this invention, greater use of the milk solids not fat, as a human food, especially in the form of ice cream, may be made thereby contributing to the general food supply, in a highly desirable form, those elements which are most lacking in the modern diet; namely, calcium and phosphorus, and in addition the valuable proteins as well as the lactose or milk sugar inherently present in normal milk solids not fat.

In its broader aspect, the invention consists in adding to the mixture being treated or frozen the desired additional quantity of milk solids not fat, in a condition wherein the lactose is undissolved and in an impalpable condition and at a time when the lactose will remain substantially in its undissolved condition. Powdered skim milk such as can be readily obtained on the market today seems to be better suited for these purposes from a practical standpoint, as it is believed that it is of the utmost importance that the lactose be undissolved and in an impalpable condition and that this result can be most readily accomplished with the use of the powdered skim milk. At least such has been found to be true in experiments conducted up to the present time but, no doubt, equally good results can be obtained with the use of other materials and it is not intended to limit the present invention to the use of the skim milk powder.

Referring more specifically to the procedure contemplated in the present instance for the preparation of ice cream the usual ice cream mixture is prepared in any approved manner excepting the use of gelatine therein. In practicing the present invention the amount of gelatine used is materially reduced or may be entirely eliminated, and the amount of flavoring material, for instance vanilla, is increased in proportion to the increase of milk solids not fat, which is desired to have present in the final frozen product. Before placing the ice cream mixture in the freezer decision should be made as to the percentage or quantity of milk solids not fat, and particularly the percentage of milk proteins that it is desired to have present in the finished ice cream, and by mathematical calculation it can be rather accurately ascertained what portion of such milk solids not fat, should be contained in the mixture to be originally placed in the freezer and what proportion of such solids should be added at a time after the freezing operation has begun. These calculations having been made the original mixture having a portion of milk solids not fat therein, is placed in the freezer and the freezing operation started, the remaining proportion of milk solids not fat, being weighed out in the form of powdered skim milk ready to be added at the proper time to the mixture being frozen. After the mixture is partially congealed by the freezing operation the skim milk powder in dry form, which has been previously weighed out, is added to the freezing mixture. When using the usual factory ice cream freezer wherein the heat is absorbed in the form of refrigerated brine the better practice seems to be to add the milk powder approximately one minute before the brine is shut off. However, there is some leeway on this point. That is, the skim milk powder may be added a little earlier or later without effecting the satisfactory results which have been heretofore obtained. With the type of freezer just mentioned the skim milk powder may be added through the opening which is provided in the freezer for placing fruits or nuts, or other constituents, in the freezing mixture. With such a method as this the ice cream obtained will be found to contain the desired quantity of milk solids not fat, especially the milk proteins, while at the same time, the cream will be of uniform, smooth consistency by reason of the fact that if there should be present therein any crystals of milk sugar such crystals will not be of any appreciable size such as would tend to impart to the cream that characteristic which has heretofore been referred to as being "sandy". It will also possess a higher degree of resistivity to the so-called heat shock as compared to ordinary ice cream and, in addition, its liability to shrinking while standing, as when stored in the off season or as it is dispensed to customers, will be greatly curtailed. These highly beneficial results are believed to be obtained by reason of the fact that a portion of the milk solids not fat, in an undissolved and impalpable condition, is added to the original mixture after the latter has been reduced in temperature or partially congealed, under which circumstances the milk sugar which necessarily goes into the mixture with the milk solids not fat that are added after the original mixture has been reduced in temperature or remains in a substantially undissolved state so that the entire mixture is not supersaturated with milk sugar and as a result crystallization of the super-abundance of milk sugar, so to speak, cannot take place. This prevention of crystallization of the milk sugar is also believed to be augmented because while the affinity of the proteins for water is such as to render them readily soluble the milk sugar possesses such a high degree of insolubility that it is capable of being maintained in the solid form in which it is introduced in the batch of material added to the original mixture after the latter has been partially congealed. It has also been found that with the process above outlined the amount of yield or swell is subject to the control of the operator to an extent heretofore unobtainable.

Actual experiment in the ice-cream-making industry, or rather investigational work which has been done in that field, has demonstrated that it is rather an easy matter to use from 35% to 36% total solids in the ice cream mix and still keep the butter fat slightly above 10%. If it is assumed that the sugar content other than lactose of the mix averages 14%, the butter fat 10% to 12%, and this amount deducted from the 35% of solids, it would leave substantially 11% of milk solids not fat. A little over one-half of these milk solids not fat, would be lactose or milk sugar and it has been ascertained rather conclusively that if the milk sugar content of an ice cream mix is increased above 5.85% lactose crystals will undoubtedly form and will produce what is known as "sandy" ice cream. In other words, 11% to 12% milk solids not fat, is about the limit for the safe manufacture of commercial ice cream that will not produce lactose crystals or "sandy" ice cream. However, if additional milk solids not fat, can be added, they will be highly desirable as they are not only inexpensive but the increase in the milk solids not fat, always tends to make a finer texture and a smooth product. The difficulty as before pointed out, however, has always been that super-saturation with lactose results in the formation of lactose crystals or "sandy" ice cream. With the present method this difficulty is overcome and by preventing the formation of lactose crystals before pointed out, it is possible to increase the percentage of milk solids not fat, to substantially any degree desired. For instance, in actual experiments where 10.5% milk solids not fat, were used in the original mix and it was desired to have approximately 16% (a percentage found very satisfactory) five gallons of the mix were placed in a ten gallon freezer and after the water in the mix had commenced to congeal two and one-half pounds of high quality skim milk powder were added. Other quantities which should be used are substantially as follows:

In a fifteen gallon freezer where substantially seven and one-half gallons mix were used three and three-quarters pounds of skim milk powder would be used. In a twenty gallon freezer five additional pounds of skim milk powder would be used; in a twenty-five gallon freezer six and one-quarter pounds additional skim milk powder would be used; in a thirty gallon freezer seven and one-half pounds skim milk powder would be used; and, in a forty gallon freezer ten pounds would be used.

It will be understood that the foregoing figures have been given simply to disclose what proportions or percentages of dry skim milk powder added after the original mix has been partially congealed have been found to give rather highly satisfactory results, but it is not intended that the present invention be limited to any definite figures except as expressly set forth in the appended claims.

The foregoing limitations as to the percentages of lactose and milk solids not fat, which may be used without producing sandy ice cream, also result in limiting the percentage of proteins, casein, etc., it being practically impossible to utilize more than approximately 4.96% proteins and 4.2% casein without incorporating a percentage of lactose that will result in "sandy" cream. With the present invention, however, such limitations do not exist, and these ingredients may be readily used in any desired quantities exceeding the percentages stated without detracting from the smooth consistency of the resulting product.

What I claim is:

1. The step in the process of producing a frozen food product from a mixture containing milk solids, including milk sugar in an impalpable condition, which consists in incorporating a portion of said solids in the mixture after the latter has been partially frozen.

2. The process of producing a frozen food product of smooth consistency and containing in excess of 12 per cent milk solids not fat which consists in originally preparing a mixture containing a portion of said solids, partially freezing the same, and subsequently adding to the partially frozen mixture additional milk solids in substantially dry powdered form to bring the total milk solids to the desired percentage.

3. The process of producing a frozen food product of smooth consistency and containing in excess of 12 per cent milk solids not fat which consists in originally preparing a mixture containing a portion of said solids, partially freezing the same, and subsequently adding to the partially frozen mixture additional milk solids in the form of a powder and maintaining the milk sugar in such powdered milk solids in solidified form.

4. The process of producing a frozen food product from a mixture containing milk solids including milk sugar which consists in incorporating a portion of said solids in the mixture in an undissolved and impalpable condition after the mixture has been reduced to a condition wherein the milk sugar remains substantially undissolved.

5. A frozen food product such as ice cream or the like of smooth consistency and containing milk solids including milk sugar or lactose, there being more than 6.50 per cent milk sugar or lactose in said product and a portion of said sugar being present in an undissolved and impalpable condition.

6. A frozen food product such as ice cream or the like, containing milk solids, including milk sugar, a portion of said sugar being present in the finished product in an undissolved and impalpable condition and said finished product being of smooth consistency as to its milk sugar content.

7. A frozen food product such as ice cream or the like of smooth consistency and containing milk solids including milk sugar or lactose, there being a greater amount of milk sugar or lactose in said product than the water content of the mixture can permanently carry in solution and a portion of said sugar being present in an undissolved and impalpable condition.

CHESTER EARL GRAY.